Re. 24561

Jan. 3, 1956 — G. J. HAND, SR — 2,729,409
AERODYNAMIC AIRCRAFT BRAKE

Filed Oct. 1, 1953 — 3 Sheets-Sheet 1

George J. Hand, Sr.
INVENTOR.

BY Clarence A. O'Brien
and Harvey B. Jacobson
Attorneys

Jan. 3, 1956
G. J. HAND, SR
2,729,409
AERODYNAMIC AIRCRAFT BRAKE
Filed Oct. 1, 1953
3 Sheets-Sheet 2
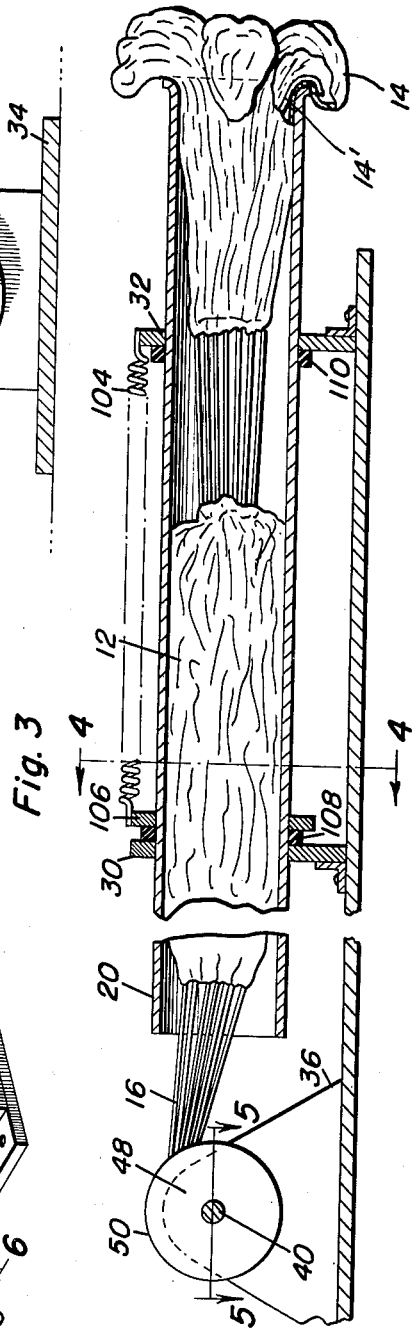
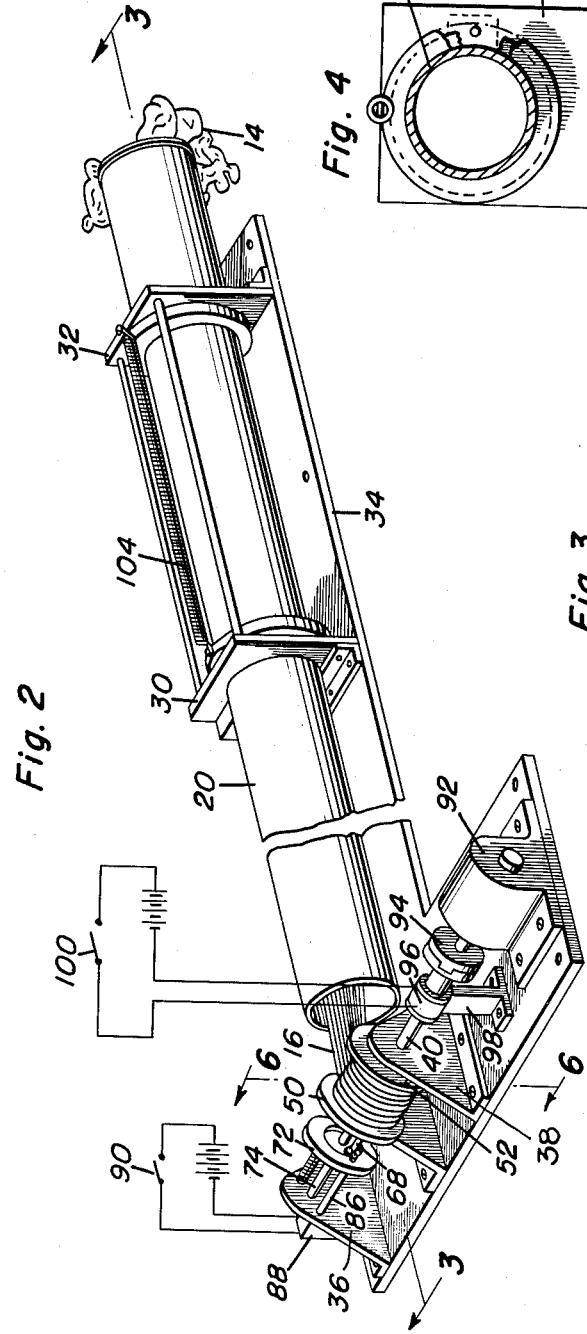
George J. Hand, Sr.
INVENTOR.
BY *Clarence A. O'Brien*
*and Harvey B. Jacobson*
Attorneys

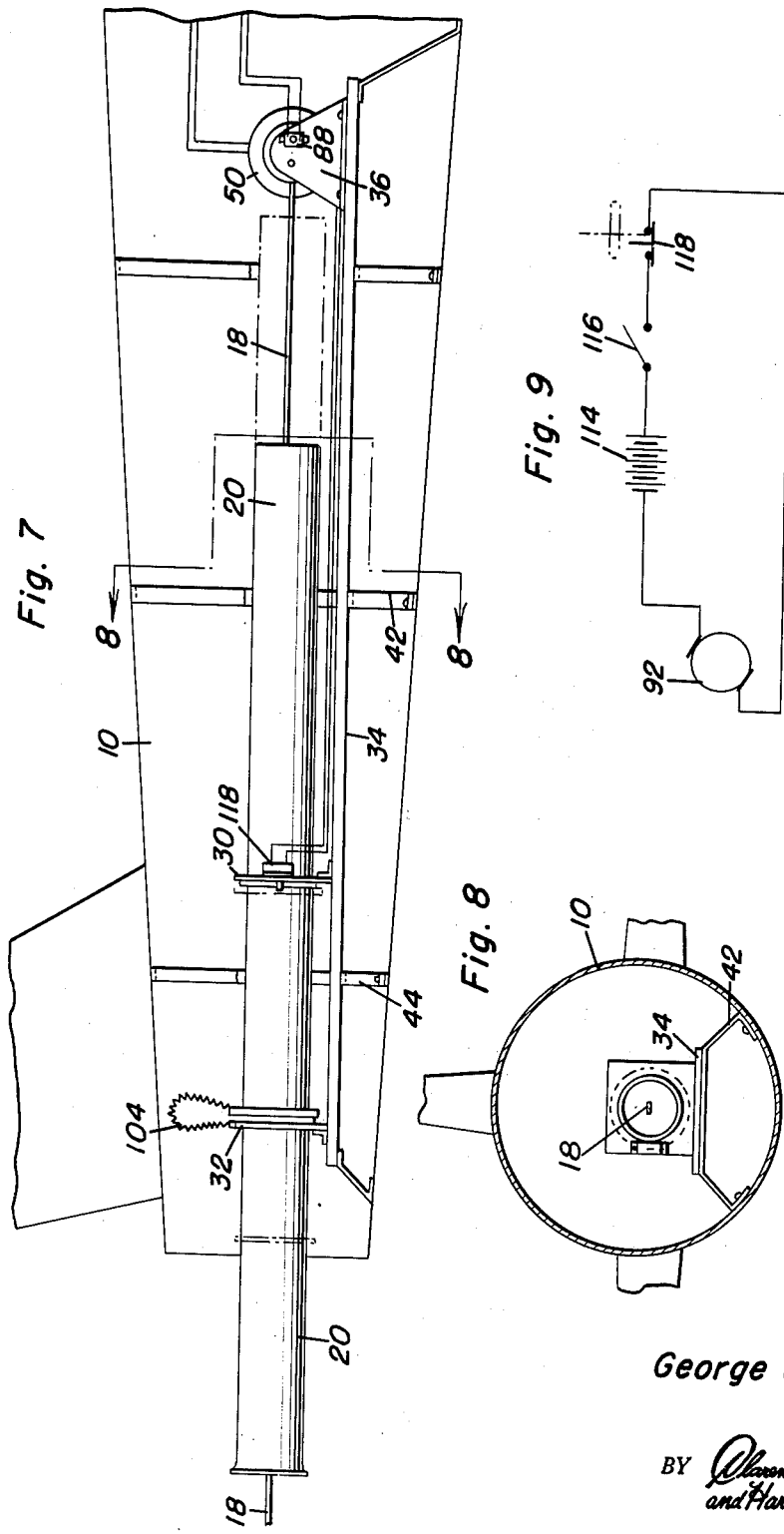

United States Patent Office 2,729,409
Patented Jan. 3, 1956

2,729,409

AERODYNAMIC AIRCRAFT BRAKE

George J. Hand, Sr., Baltimore, Md., assignor, by mesne assignments, to Decelo-Chute Corp.

Application October 1, 1953, Serial No. 383,431

4 Claims. (Cl. 244—113)

This invention relates to an aircraft brake and particularly to a canopy-type brake adapted to be contained in a tubular housing and projected into the wind stream or retrieved into the tubular housing as may be desired.

In the landing of aircraft, particularly high speed aircraft, it is very desirable that means be provided for braking the speed of the aircraft as it comes in for a landing. Heretofore many types of landing devices have been provided for braking the speed of aircraft and various types of decelerating chutes have been attached to aircraft for this purpose. However, the heretofore known decelerating chutes have been highly unsatisfactory in operation and cumbersome and dangerous to use.

In the construction according to the present invention a decelerating chute is housed in a tubular member which may be withdrawn out of the air stream and biased into operative position so that when it is released it will project the chute into the air stream so that a pilot chute will pull the brake chute out of the tubular housing and cause it to expand to apply braking pressure to the aircraft. After the aircraft has been stopped the chute may be readily retrieved and at the same time withdrawing the projectile housing so that the entire device will be stored indoors and without danger of being accidentally whipped out during maneuvering of the aircraft.

It is accordingly an object of the invention to provide an improved aircraft brake.

It is a further object of the invention to provide an improved housing for a brake chute.

It is a further object of the invention to provide a retrieving device for retrieving a chute after being used and means for housing the retrieved chute.

It is a further object of the invention to provide a retractor housing for storing the housed chute indoors.

It is a further object of the invention to provide means for jettisoning the chute in the event of emergency.

Other objects and many of the attendant advantages of the present invention will be apparent from the following detailed description taken in conjunction with the accompanying drawing in which:

Figure 2 is a perspective view of the chute control apparatus in loaded position;

Figure 3 is an enlarged sectional elevation through the loaded chute projector taken substantially on the plane indicated by the section line 3—3 of Figure 2;

Figure 4 is a cross section through the projector taken substantially on the plane indicated by the section line 4—4 of Figure 3;

Figure 7 is a side elevation of the projector in released position;

Figure 8 is an end view of the projector taken substantially on the plane indicated by the section line 8—8 of Figure 7; and Figure 9 is a schematic diagram of the retriever circuit.

Figures 1, 5, 6:
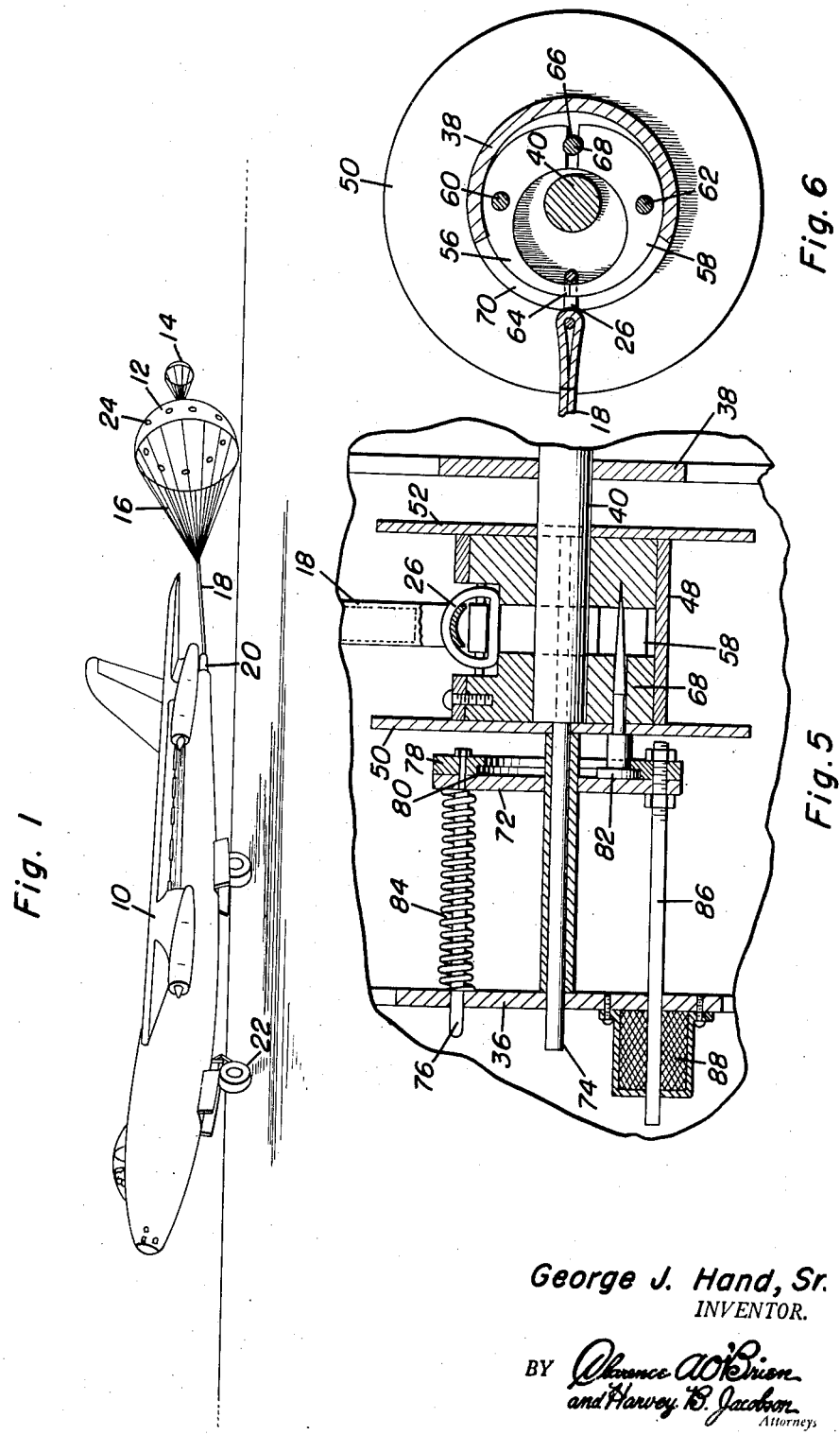
Figure 1 is a side elevation of an aircraft landing by the aid of the decelerating chute according to the invention.
Figure 5 is a longitudinal section through the jettison release jaws taken substantially on the plane indicated by the section line 5—5 of Figure 3.
Figure 6 is a cross section through the release taken substantially on the plane indicated by the section line 6—6 of Figure 2.

In the exemplary embodiment according to the invention, an aircraft 10 herein shown as of the reaction propelled type is provided with a load decelerating or brake chute 12 having a pilot chute 14 attached thereto and being provided with a plurality of shroud lines 16 which are connected to a control line 18 which extends through a tubular housing 20. Preferably the aircraft 10 is provided with landing wheels 22 so that the craft may be propelled along the surface after landing.

The brake chute or load chute 12 is provided with a plurality of load relief valves 24 so that the chute 12 is protected against shock when being projected into the air stream and opened at high speed. The shroud lines 16 are connected to the control line 18 which is preferably a nylon strap of suitable width which is connected to a D ring 26 for connecting with the jettison jaws presently to be described.

The tubular housing member for the chute 12 is provided with a pair of guide brackets 30 and 32 which are mounted on a suitable base 34 which is adapted to be mounted within the aircraft. The base 34 is preferably of T-shape formation and has mounted thereon a pair of upstanding brackets 36 and 38 in which is journalled a shaft 40. The platform 34 may be mouned in the aircraft 10 by any suitable means such as the mounting brackets 42 and 44 (Figures 7 and 8). A winding drum 48 is mounted on the shaft 40 and rigidly attached thereto and is preferably of substantial hollow construction and has the end members 50 and 52. The control line 18 having the D-ring 26 is connected to the drum 48 by means of a pair of arcuate jaws 56 and 58 mounted on the interior of the drum 38 by means of pivot pins 60 and 62. The pivoted jaws 56 and 58 are provided with forwardly leaning jaws 64 and rear openings 66. A tapered wedge 68 is adapted to slide transversely of the opening 66 and forces the jaws 64 into closed position so that the D ring 26 may be rigidly retained in the drum which is provided with an aperture 70 for receiving the D ring 26. For controlling the wedge 68 a guide track 72 is journalled on a guide shaft 74 and maintained in non-rotative position by means of suitable guide pins 76. The guide plate 72 is provided with a forward track 78 which provides an annular groove 80 and in which slides a head 82 of the tapered wedge 68. Springs 84 positively urge the plate 72 along the shaft 74 toward the drum 48 so that the wedge 68 is urged to penetrate a transverse position between the jaws 56 and 58 so that the jaws 64 are pressed into firm relation to retain the D ring 26. An actuating rod 86 is connected to the plate 72 and is controlled by means of a solenoid 88 which will be controlled by means of a manual switch 90 so that the operator may jettison the chute at any time to prevent undue stresses to his craft.

The drum 48 is driven by an electric motor 92 which is mounted on the base 34 and has a clutch 94 in driving relation with the shaft 40 and a magnetic clutch 96 is mounted on a standard 98 and controls the position of the shaft 40. The magnetic clutch or brake 96 being controlled by a control switch 100 under the control of a pilot of the vehicle.

The tube 20 being slidable in the brackets 30 and 42 is provided with resilient or biasing means 104 which positively urge the tube 20 to a projected position because of the connection of the resilient means 104 with the guide bearing 32 and a collar 106 fixed on the tube 20.

Resilient bumpers 108 and 110 are mounted on the bearings 30 and 32 respectively so that the collar 106 will be cushioned when it comes in contact with either of the bearing plates 30 or 32.

The motor 92 is supplied with energy from any suitable device such as the battery 114 and is controlled by means of a pilot control switch 116 and an automatic stop switch 118.

In the operation of the construction according to the device, the control line 18 will be passed through the tubular housing 40 and the D ring will be positioned in the jaws 56 and 58 and the wedge 63 will be moved into position to lock the D ring in position. Closing the switch 116 will then start the motor 92 which will wind up the control line 18 and the shroud lines 16 into the tube 20 and cause the decelerating chute 12 to be moved into housing position in the tube 20. The parachute 14 will then come in contact with the end of the housing tube 20 and because of the spring ribs 14' therein will engage the end of the housing 20 and cause the housing 20 to move forward against the tension of the springs 104. When the housing has moved into completely retrieved position, the collar 106 will actuate the switch 118 so as to decontrol the motor 92 and allow the magnetic clutch 96 to actuate to engage the shaft 40 and prevent its turning. When the aircraft comes in for a landing the pilot will energize the clutch 96 and disconnect the reel 48 from the motor 92 which will release the tube 20 which under the impetus of the springs 104 will project the end of the tube outwardly through the body of the aircraft into the slip stream so that the pilot chute 14 will be entrained by the slip stream which will pull the chute 12 out of the tube 20 which will distend to the full length of the shroud 16 and the control line 18. The opening of the chute will be controlled by means of a relief valve 24 so that the sudden shock will not destroy the canopy and the load will be gradually applied thereto so that the valves 24 may close and the chute or canopy retain its complete effectiveness over varied load or speed range so that the device will be operative as a brake at high speed with the valves open and effective at low speed with the valves closed so that over the complete stopping interval the decelerator chute 12 will be effective to control or reduce the speed of the aircraft 10.

In the event of emergency when it would be necessary for the aircraft to immediately take off again, or in case the chute 12 should become fouled or otherwise disabled, the pilot may readily jettison the chute 12 by pressing the switch 90 so that the wedge shaped rod will be withdrawn from between the jaws 56 and 58 allowing the jaws 64 to open and drop the D ring 26 so that the craft will be immediately free of the restraint of the chute.

For purposes of exemplification a particular embodiment of the invention has been shown and described according to the best present understanding thereof. However, it will be apparent to those skilled in the art that various changes and modifications may be made in the construction and arrangement of the parts thereof without departing from the true spirit and scope of the invention.

What is claimed as new is as follows:

1. A deceleration brake for an aircraft comprising a canopy, shroud lines on said canopy, an automatic pilot chute attached to said canopy, a control line attached to said shroud lines, a storage tube for said canopy, mounting brackets adapted to mount said tube in an aircraft, said tube having limited sliding movement in said brackets whereby the outer end of said tube is movable to a position within or a position outside the body of an aircraft, said control line extending through said tube, a reel mounted in alignment with said tube, biasing means urging said tube to distended position, means for operating said reel to retrieve said control line to store said canopy in said tube, said pilot chute engaging said tube whereby said tube is moved to retracted position controllable jaws attaching said control line to said reel.

2. A deceleration brake for an aircraft comprising a canopy, shroud lines on said canopy, an automatic pilot chute attached to said canopy, a control line attached to said shroud lines, a storage tube for said canopy, mounting brackets adapted to mount said tube in an aircraft, said tube having limited sliding movement in said brackets whereby the outer end of said tube is movable to a position within or a position outside the body of an aircraft, said control line extending through said tube, a reel mounted in alignment with said tube, biasing means urging said tube to distended position, means for operating said reel to retrieve said control line to store said canopy in said tube, said pilot chute engaging said tube whereby said tube is moved to retracted position, jettison jaws releasably attaching control line to said drum, including a pair of arcuate jaws pivoted in said reel, a sliding wedge mounted transversely at one end of said jaws, and means for moving said wedge transversely of said jaws.

3. A deceleration brake for an aircraft comprising a canopy, shroud lines on said canopy, an automatic pilot chute attached to said canopy, a control line attached to said shroud lines, a storage tube for said canopy, said control line extending through said tube, a reel mounted in alignment with said tube, biasing means urging said tube to distended position, means for operating said reel to retrieve said control line to store said canopy in said tube, said pilot chute engaging said tube whereby said tube is moved to retracted position, jettison jaws releasably attaching said control line to said drum, including a pair of arcuate jaws pivoted in said reel, a sliding wedge mounted transversely at one end of said jaws, and means for moving said wedge transversely of said jaws, a head on said wedge, an annular guide receiving said head, biasing means urging said guide toward said reel, and means for moving said guide away from said reel to withdraw said wedge from between said jaws.

4. A jettison connection for attaching a line to a reel comprising a pair of jaws pivoted in said reel, said reel having a recess exposing one end of said jaws, a wedge movable into and out of contact with the other ends of said jaws, a head on said wedge, a guide track concentric with said reel, said head being received in said guide track, biasing means urging said guide track toward said reel to maintain said wedge in contact with said jaws, and means for moving said guide track away from said reel.

References Cited in the file of this patent

UNITED STATES PATENTS

| | | |
|---|---|---|
| 1,024,676 | Burford | Apr. 30, 1912 |
| 2,513,867 | Heffernan | July 4, 1950 |
| 2,634,924 | Brown | Apr. 14, 1953 |